(12) United States Patent
Kamiya et al.

(10) Patent No.: US 11,473,844 B2
(45) Date of Patent: Oct. 18, 2022

(54) TEMPERATURE MONITORING DEVICE, TEMPERATURE MONITORING METHOD, AND COMPOSITE MATERIAL MANUFACTURING METHOD

(71) Applicant: MITSUBISHI HEAVY INDUSTRIES, LTD., Tokyo (JP)

(72) Inventors: Masami Kamiya, Tokyo (JP); Kazuki Noma, Tokyo (JP); Jun Eto, Tokyo (JP); Akihisa Okuda, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 269 days.

(21) Appl. No.: 16/954,634

(22) PCT Filed: Mar. 4, 2019

(86) PCT No.: PCT/JP2019/008376
§ 371 (c)(1),
(2) Date: Jun. 17, 2020

(87) PCT Pub. No.: WO2019/188016
PCT Pub. Date: Oct. 3, 2019

(65) Prior Publication Data
US 2021/0123680 A1 Apr. 29, 2021

(30) Foreign Application Priority Data

Mar. 28, 2018 (JP) .............................. JP2018-061240

(51) Int. Cl.
*G01K 1/14* (2021.01)
*F27D 21/00* (2006.01)
(Continued)

(52) U.S. Cl.
CPC ...... *F27D 21/0014* (2013.01); *B29C 35/0227* (2013.01); *B29C 70/54* (2013.01); *G01K 1/14* (2013.01); *F27M 2003/08* (2013.01)

(58) Field of Classification Search
CPC ... F27D 21/0014; B29C 35/0227; G01K 1/14; G01K 1/08; G01K 13/02; G01K 7/22;
(Continued)

(56) References Cited

U.S. PATENT DOCUMENTS 4,553,852 A * 11/1985 Derderian .............. G01N 25/18
374/30
4,630,938 A * 12/1986 Piorkowska-Palczewska ..............
G01N 25/18
374/43

(Continued)

FOREIGN PATENT DOCUMENTS

| JP | 5599536 B2 | 10/2014 | |
|---|---|---|---|
| WO | WO-2020025492 A1 * | 2/2020 | ............... C03B 5/16 |
| WO | WO-2021003140 A1 * | 1/2021 | ............... A61B 5/015 |

OTHER PUBLICATIONS

PCT/ISA/210, "International Search Report for International Application No. PCT/JP2019/008376," dated May 28, 2019.
(Continued)

*Primary Examiner* — Gail Kaplan Verbitsky
(74) *Attorney, Agent, or Firm* — Manabu Kanesaka; Benjamin Hauptman; Kenneth Berner (57) ABSTRACT

This temperature monitoring device (100) can be placed in a furnace together with a composite material. The temperature monitoring device (100) includes: a pair of internal components (10) that each have a temperature detection surface (11) and are layered such that the temperature detection surfaces (11, 11) face each other; a temperature detection unit (30) disposed so as to be sandwiched between the temperature detection surfaces (11, 11); at least a pair of
(Continued)

external components (20) that are respectively disposed on reverse sides from the temperature detection surfaces (11); and an adjustment part (50) capable of adjusting the sizes of the thickness-direction gaps between the internal components (10) and external components (20).

5 Claims, 5 Drawing Sheets

(51) Int. Cl.
  *B29C 35/02* (2006.01)
  *B29C 70/54* (2006.01)
(58) Field of Classification Search
  CPC .......... G01K 1/16; G01K 13/024; G01K 7/02; G01K 1/024; G01K 7/16; G01K 1/20; G01K 13/20; G01K 2217/00; G01K 11/22; G01K 3/005; G01K 7/00; G01K 1/12; G01K 2201/02; G01K 1/146; G01K 13/00; G01K 13/026; G01K 1/125; G01K 11/3206; G01K 2205/00; G01K 2205/04; G01K 7/04; G01K 1/026; G01K 1/143; G01K 1/165; G01K 11/32; G01K 2207/06; G01K 7/01; G01K 7/18; G01K 7/24; G01K 2003/145; G01K 2201/00; G01K 3/14; G01K 7/021; G01K 1/02; G01K 13/028; G01K 13/06; G01K 13/08; G01K 2205/02; G01K 7/028; G01K 7/10; G01K 7/42; G01K 7/427; G01K 1/022; G01K 11/02; G01K 15/007; G01K 17/00; G01K 1/00; G01K 1/10; G01K 1/18; G01K 1/26; G01K 15/005; G01K 17/08; G01K 2203/00; G01K 2207/08; G01K 7/06; F27M 2003/08
  See application file for complete search history.

(56) References Cited

U.S. PATENT DOCUMENTS

| | | | |
|---|---|---|---|
| 5,005,985 A * | 4/1991 | Piorkowska-Galeska | G01N 25/18 374/43 |
| 5,667,301 A * | 9/1997 | Jurkowski | G01N 33/442 374/43 |
| 5,931,580 A * | 8/1999 | Wyland | G01K 7/01 374/166 |
| 6,116,777 A * | 9/2000 | Pause | G01N 33/36 374/43 |
| 7,226,206 B2* | 6/2007 | Romes | G01K 17/08 374/E17.008 |
| 2010/0074299 A1* | 3/2010 | Nyffenegger | G01K 7/16 374/185 |
| 2014/0312519 A1* | 10/2014 | Hirano | B29C 35/0288 264/40.6 |

OTHER PUBLICATIONS

PCT/ISA/237, "Written Opinion of the International Searching Authority for International Application No. PCT/JP2019/008376," dated May 28, 2019.

* cited by examiner

TEMPERATURE MONITORING DEVICE, TEMPERATURE MONITORING METHOD, AND COMPOSITE MATERIAL MANUFACTURING METHOD

TECHNICAL FIELD

The present invention relates to a temperature monitoring device, a temperature monitoring method, and a composite material manufacturing method.

Priority is claimed on Japanese Patent. Application No. 2018-061240, filed on Mar. 28, 2018, the content of which is incorporated herein by reference.

BACKGROUND ART

In recent years, an example of forming a fuselage and wings of an aircraft with a composite material such as fiber reinforced plastic (FRP) has been increased. As an FRP product manufacturing method, a method using a heating furnace such as an autoclave and an oven is known. In this method, after an intermediate product is molded by laying up prepregs, the intermediate product is cured by heating/pressurizing in a heating furnace. The prepregs are sheet-like members which are obtained by infiltrating reinforcing fibers into thermosetting resins.

The thermosetting resin starts curing reaction through heating. A reaction speed of the curing reaction rises according to a temperature of the thermosetting resin. In addition, some thermosetting resins self-generate heat as the curing reaction proceeds. That in controlling the curing reaction of the thermosetting resin, it necessary to manage heat input from the outside and the self-heating in a balanced manner.

Various techniques have been proposed so far to achieve an object of realizing such temperature management. As an example of such techniques, a technique disclosed in PTL 1 below is known. PTL 1 discloses the technique of controlling a heating temperature based on prediction on a temperature change of a thermosetting material (resin).

CITATION LIST

Patent Literature

[PTL 1] Japanese Patent No. 5599536

SUMMARY OF INVENTION

Technical Problem

However, in the technique disclosed in PTL 1, a temperature of a composite material in a furnace is acquired only based on a predicted value of the temperature change. Therefore, there is a possibility that a temperature corresponding to the actual temperature of the composite material in the furnace cannot be acquired.

The present invention is devised to solve the problems, and an object thereof to provide a temperature monitoring device, a temperature monitoring method, and a composite material manufacturing method that allow easily acquiring a temperature corresponding to an actual temperature of a composite material in a furnace.

Solution to Problem

According to a first aspect of the invention, there is provided a temperature monitoring device that is able to be disposed in a furnace together with a composite material. The temperature monitoring device includes a pair of inner components that each have a temperature detection surface and overlap each other such that the temperature detection surfaces face each other, a temperature detecting unit that is disposed so as to be sandwiched between the temperature detection surfaces, at least a pair of outer components that are provided on opposite sides to the temperature detection surfaces of the pair of inner components respectively, and an adjustment part that is capable of adjusting a dimension of a gap between the inner component and each of the outer components in a thickness direction.

In the configuration, by disposing and heating the temperature monitoring device in a furnace together with a composite material, the temperature monitoring device can reproduce a temperature change of the composite material under the same condition as the composite material. Further, the temperature monitoring device can freely and easily change a heat capacity of the temperature monitoring device by the adjustment part adjusting the dimension of the gap between the inner component and the outer component.

Therefore, the temperature monitoring device can easily acquire a temperature corresponding to an actual temperature of the composite material in the furnace.

The temperature monitoring device of a second aspect is the temperature monitoring device of the first aspect in which a plurality of pairs of the outer components are provided.

The temperature monitoring device of a third aspect is the temperature monitoring device of the first or second aspect including a heat insulating supporting member that covers the inner component, the outer component, and the gap from both sides in a direction intersecting the thickness direction and has a higher heat insulating property than the inner component and the outer component.

According to a fourth aspect of the invention, there is provided a temperature monitoring method using a temperature monitoring device that is able to be disposed in a furnace together with a composite material. The temperature monitoring device includes a pair of inner components that each have a temperature detection surface and overlap each other such that the temperature detection surfaces face each other, a temperature detecting unit that is disposed so as to be sandwiched between the temperature detection surfaces, and at least a pair of outer components that are provided on opposite sides to the temperature detection surfaces of the pair of inner components respectively. The temperature monitoring method includes a thickness determination step of determining a dimension of a gap between the inner component and each of the outer components in a thickness direction based on a heat capacity of the composite material and an adjustment step of adjusting the dimension determined in the thickness determination step.

In the method, by disposing and heating the temperature monitoring device in the furnace together with the composite material, the temperature monitoring method allows the temperature change of the composite material to be reproduced under the same condition as the composite material. Further, the temperature monitoring method allows the heat capacity of the temperature monitoring device to be freely and easily changed by adjusting the dimension of the gap between the inner component and the outer component in the adjustment step.

Therefore, the temperature monitoring method allows a temperature corresponding to an actual temperature of the composite material in the furnace to be easily acquired.

According to a fifth aspect of the invention, there is provided a composite material manufacturing method including the temperature monitoring method according to the fourth aspect and heating step of heating the composite material in the furnace.

Advantageous Effects of Invention

According to the aspects described above, a temperature corresponding to the actual temperature of the composite material in the furnace can be easily acquired.

DESCRIPTION OF EMBODIMENTS

Embodiment

An embodiment of the present invention will be described with reference to FIGS. 1 to 4.

Figure 1:
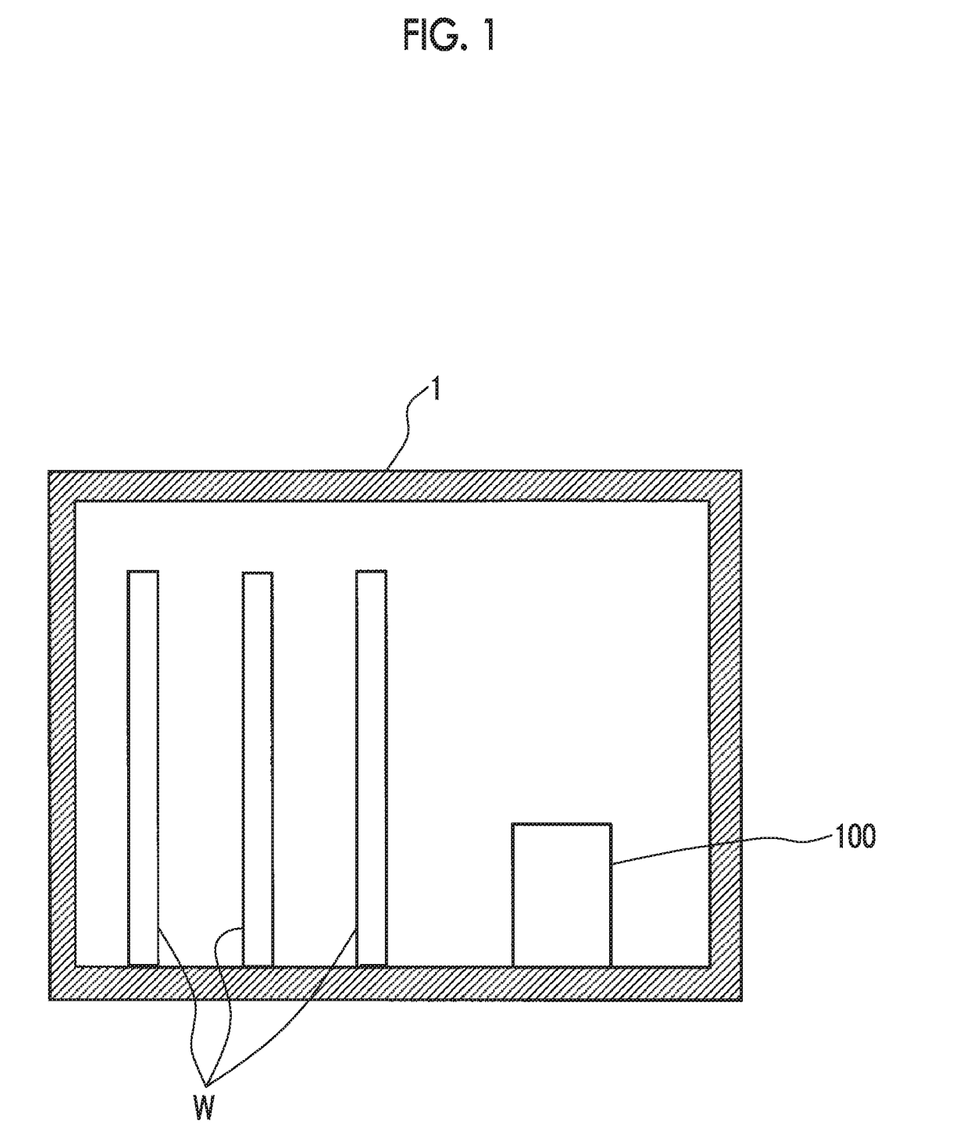
FIG. 1 is a view illustrating a situation where a temperature monitoring device according to an embodiment of the present invention is used.

A temperature monitoring device 100 according to the embodiment is used to achieve an object of temperature management of a composite material component when manufacturing an FRP product in an autoclave (a heating furnace 1). In order to control curing reaction of the composite material component, it is necessary to appropriately manage an internal temperature of the product. However, in a case where a measuring device is provided inside the product, a strength decrease and deformation occur in the product in some cases. For this reason, the temperature monitoring device 100 is used to achieve an object of complementarily simulating the internal temperature without actually measuring the internal temperature.

Temperature Monitoring Device

Specifically, as illustrated in FIG. 1, the temperature monitoring device 100 is disposed in the heating furnace together with composite materials W which are composite material components. The composite materials W are panel-like members formed by laying up a plurality of prepregs. The prepregs are sheet-like members in a semi-cured state, which are obtained by infiltrating carbon fibers into thermosetting resins. By heating the composite materials 14 in the heating furnace 1, the thermosetting resins are cured.

Figure 2:
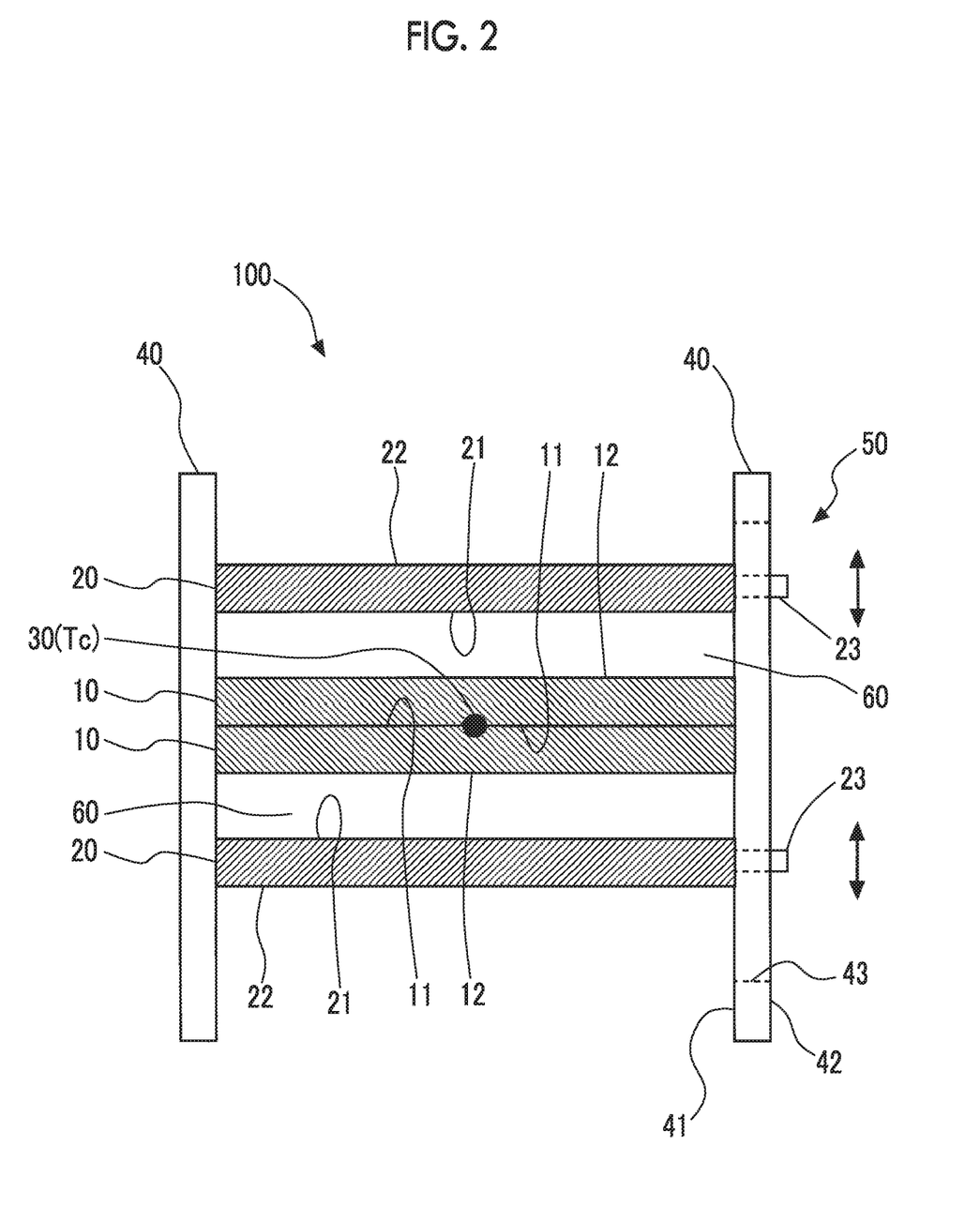
FIG. 2 is a sectional view illustrating a configuration of the temperature monitoring device according to the embodiment of the present invention.

As illustrated in FIG. 2, the temperature monitoring device 100 includes a pair inner components 10, at least a pair of outer components 20, temperature detecting unit 30, heat insulating supporting members 40, and an adjustment part 50.

In the embodiment, both of the inner components 10 and the outer components 20 are sheet-like members formed of the same material as the prepregs configuring the composite materials W described above. Heat capacities of inner components 10 may be the same as or may be different from heat capacities of the outer components 20.

One surface of both surfaces of the inner component in a thickness direction is a temperature detection surface 11. The pair of inner components 10 overlap each other without a gap such that the temperature detection surfaces 11 face each other. A weld part of a thermocouple Tc, which is the temperature detecting unit 30, is disposed between the temperature detection surfaces 11. That is, the weld part of the thermocouple Tc is sandwiched between the temperature detection surfaces 11 from both sides in the thickness direction. The thermocouple Tc is electrically connected to an arithmetic unit (not illustrated), and transmits temperatures of the temperature detection surfaces 11 to the arithmetic unit as an electric signal.

In the embodiment, the weld part of the thermocouple Tc is in contact with each of the temperature detection surfaces 11.

The pair of outer components 20 are provided on opposite sides to the respective temperature detection surfaces 11 of the pair of inner components 10.

Out of both surfaces of the inner component 10 in the thickness direction, a surface on an opposite side to the temperature detection surface 11 is a first heat input surface 12. The outer component 20 is provided to be capable of being disposed with a gap (an air layer 60) with respect to the first heat input surface 12 in the thickness direction. In the embodiment, only one pair of outer components 20 are disposed. A dimension of the air layer 60 in the thickness direction is determined based on the heat capacities (heat resistances) of the composite materials W under a method to be described later. Out of both surfaces of the outer component 20 in the thickness direction, a surface facing the first heat input surface 12 is a heat transfer surface 21. Out of both surfaces of the outer component 20 in the thickness direction, a surface facing an opposite side to heat transfer surface 21 is a second heat input surface 22.

The heat insulating supporting members 40 cover the inner components 10, the outer components 20, and the gaps between the inner components 10 and the outer components from both sides in a direction intersecting the thickness direction.

In the embodiment, the inner components 10 and the outer components 20 are supported by a pair of heat insulating supporting members 40 from both sides in a direction (a width direction) orthogonal to the thickness direction. The heat insulating supporting members 40 actually cover the entire outer peripheries of the inner components 10 and the outer components 20. The heat insulating supporting members 40 are formed of, for example, a resin material including a silicon resin. More specifically, the heat insulating supporting members 40 are formed of a material having a higher heat insulating property than the inner components 10 and the outer components 20.

The heat insulating supporting members 40 cover all surfaces of the inner components 10, the cuter components 20, and the gaps between the inner components 10 and the outer components 20, in the width direction. That is, heat input in the width direction to the inner components 10, the outer components 20, and the gaps between the inner components 10 and the outer components 20 is restricted by the heat insulating supporting members 40, and is negligibly small compared to heat input in the thickness direction.

Specifically, first, heat in the heating furnace 1 is propagated from the second heat input surfaces 22 to the heat transfer surfaces 21 of the outer components 20 in a state of being disposed in the heating furnace 1. Further, the heat is propagated from the first heat input surfaces 12 to the temperature detection surfaces 11 of the inner components 10 via the air layers 60.

Out of both surfaces of each of the heat insulating supporting members 40, a surface facing the inner components 10 and the outer components 20 is a support surface 41. A surface on an opposite side to the support surface 41 is an outer surface 42. A slit 43 penetrating from a support surface 41 side to an outer surface 42 side is formed in the heat insulating supporting member 40. The slit 43 has a long hole shape extending in the thickness direction described above.

A tab 23 that engages with the slit 43 is provided at an edge of the outer component 20 (that is, an edge facing the support surface 41 side of the heat insulating supporting member 40). The tab 23 protrudes from the edge of the outer component 20 in the width direction. By moving the tab 23 along the slit 43, a dimension of the gap between the inner component 10 and the outer component 20 in the thickness direction can be changed. That is, the adjustment part 50 is configured by the tab 23 and the slit 43.

In this case, a mechanism for restricting heat input from the slit 43 may be provided such that the tab 23 is movable along the slit 43. For example, another heat insulating material covering the slit. 43 and the tab 23 from the outer surface 42 side may be added. In addition, as another example, a gap between the tab 23 and the slit 43 may be covered with a flexible heat insulating member such as rubber and sponge.

The adjustment part 50 is configured such that the dimension of each gap between the inner component 10 and each of the outer components 20 in the thickness direction is adjustable. By adjusting the adjustment part 50, the dimension of the gap between the inner component 10 and the outer component 20 in the thickness direction changes, and the dimension of the air layer 60 described above in the thickness direction changes.

Further, by adjusting the adjustment part 50, the dimension of the gap in the thickness direction can also be adjusted, and the presence or absence of the air layer can also be changed, such that the gap between the inner component 10 and the outer component 20 is eliminated.

Temperature Monitoring Method

Figure 3:
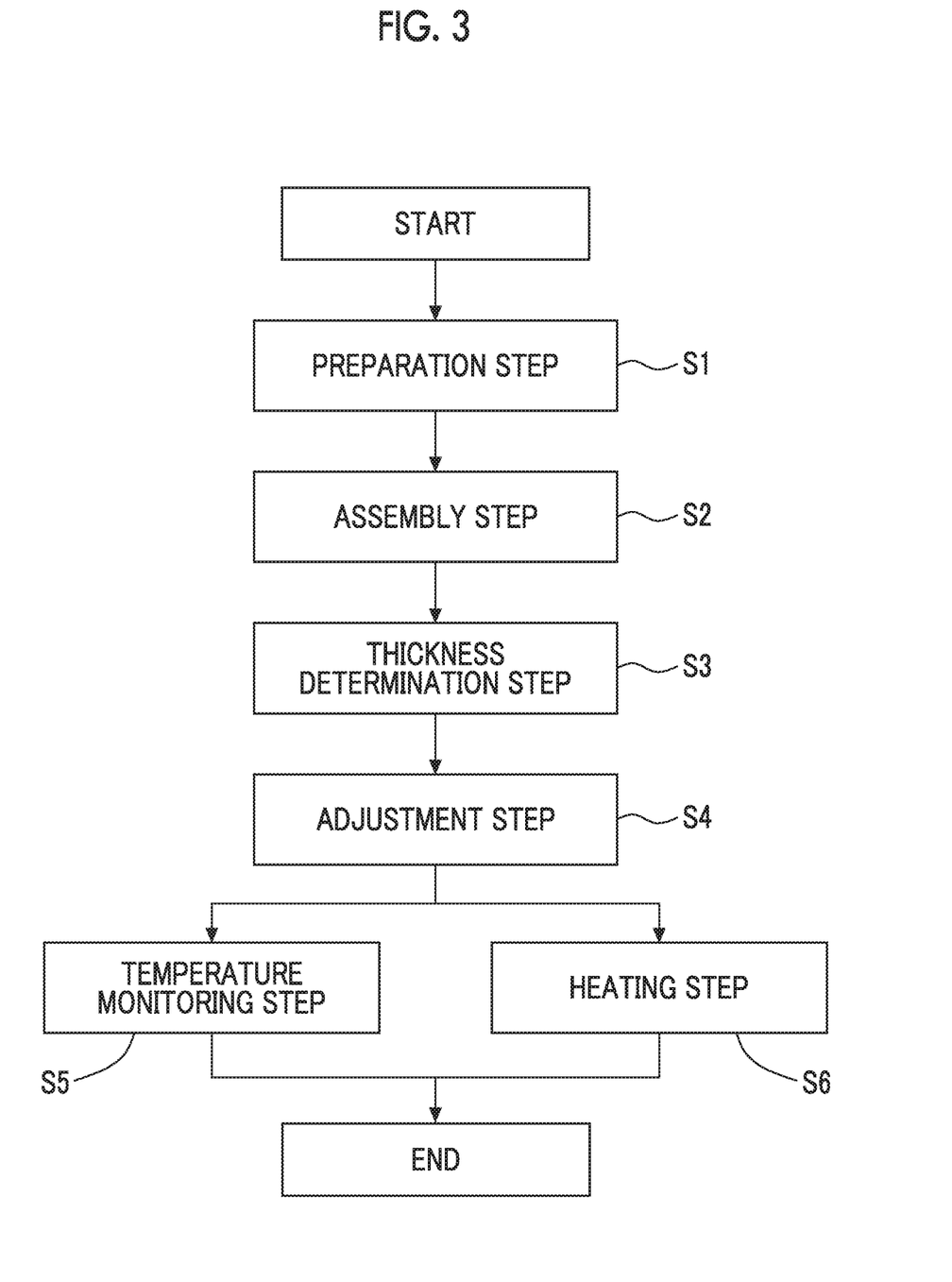
FIG. 3 is a flowchart showing each of steps of a temperature monitoring method according to the embodiment of the present invention.

Next, a temperature monitoring method using the temperature monitoring device 100 according to the embodiment will be described with reference to FIG. 3. As shown in FIG. 3, the temperature monitoring method according to the embodiment includes a preparation step S1, an assembly step S2, a thickness determination step S3, an adjustment step S4, and a temperature monitoring step S5.

In the preparation step S1, the inner components 10, the outer components 20, and the heat insulating supporting members 40, which are described above, are prepared. The weld part of the thermocouple Tc described above is sandwiched between the pair of inner components (between the temperature detection surfaces 11).

After the preparation step S1, the assembly step S2 is executed. In the assembly step S2, the inner components 10, the outer components 20, and heat insulating supporting members 40 are combined with each other. That is, each of the inner components 10 and each of the outer components 20 are clamped between the pair of heat insulating supporting members 40 from both sides in the width direction. At this time, the tabs 23 of the outer components 20 are engaged with the slits 43 of the heat insulating supporting members 40.

Next, the thickness determination step S3 is executed. In the thickness determination step S3, the dimension of the air layer 60 (the gap) in the thickness direction is determined based on the heat capacities of the composite materials W. Herein, the composite materials W generally have a large physical dimension (in particular, an area) compared to the inner components 10 and the outer components 20. Therefore, heat capacities of the composite materials W are large compared to the heat capacities of the inner components 10 and the outer components 20. Due to the difference between the heat capacities, a difference in a temperature change between the composite materials W and the temperature monitoring device 100 occurs. The air layer 60 is formed between the inner component 10 and the outer component 20 in the embodiment to achieve an object of compensating for such a difference in the temperature change. As a result, heat in the heating furnace 1 is unlikely to be propagated to the temperature detection surfaces 11 by thicknesses of the air layers 60. That is, a heat resistance of the temperature monitoring device 100 increases, thereby causing a state where the actual heat capacities of the composite materials W are reproduced.

Herein, a heat resistance R between an atmosphere in heating furnace 1 and the temperature detection surface 11 is calculated based on Expression (1) below.

$$R = R1 + R2 + R3 + R4 \qquad (1)$$

Herein, R1 is a heat resistance between the atmosphere in the heating furnace 1 and the outer component 20, and R2 is a heat resistance inside the outer component 20. R3 is a heat resistance of the air layer 60, and R4 is a heat resistance inside the inner component 10.

The heat resistances R1, R2, R3, and R4 are calculated through Expressions (2) to (5) below.

$$R1 = 1/(h1 \times A) \qquad (2)$$

$$R2 = L2/(k1 \times A) \qquad (3)$$

$$R3 = La/(k2 \times A) \qquad (4)$$

$$R4 = L3/(k3 \times A) \qquad (5)$$

A is an area of the inner component 10 and the outer component 20, and h1 is a heat transfer coefficient between the atmosphere in the beating furnace 1 and the component 20. k1, k2, and k3 are thermal conductivities of the outer component 20, the air layer 60 (air), and the inner component 10, respectively. Further, L2, La, and L3 are a thickness dimension of the outer component 20, a thickness dimension of the air layer 60, and a thickness dimension of the inner component 10, respectively.

That is, while values of R1, R2, and R4 are given, the heat resistance R3 of the air layer 60 can be changed by adjusting the thickness dimension La.

Further, when a temperature of the atmosphere in the heating furnace 1 is T1 and heat flow of the heating furnace 1 is Q, a temperature T2 of the temperature detection surface 11 is expressed as Expression (6) below using the heat resistance R described above.

$$T2 = T1 - RQ \qquad (6)$$

The heat flow Q of the heating furnace 1 is a given index based on the size and configuration of the heating furnace 1.

The heat resistance R3 of the air layer 60 is determined on a condition that a change rate of the temperature T2 of the temperature detection surface 11 is lower than a temperature change rate of a "part where a temperature change is most unlikely to occur" in the composite materials W.

Figure 4:
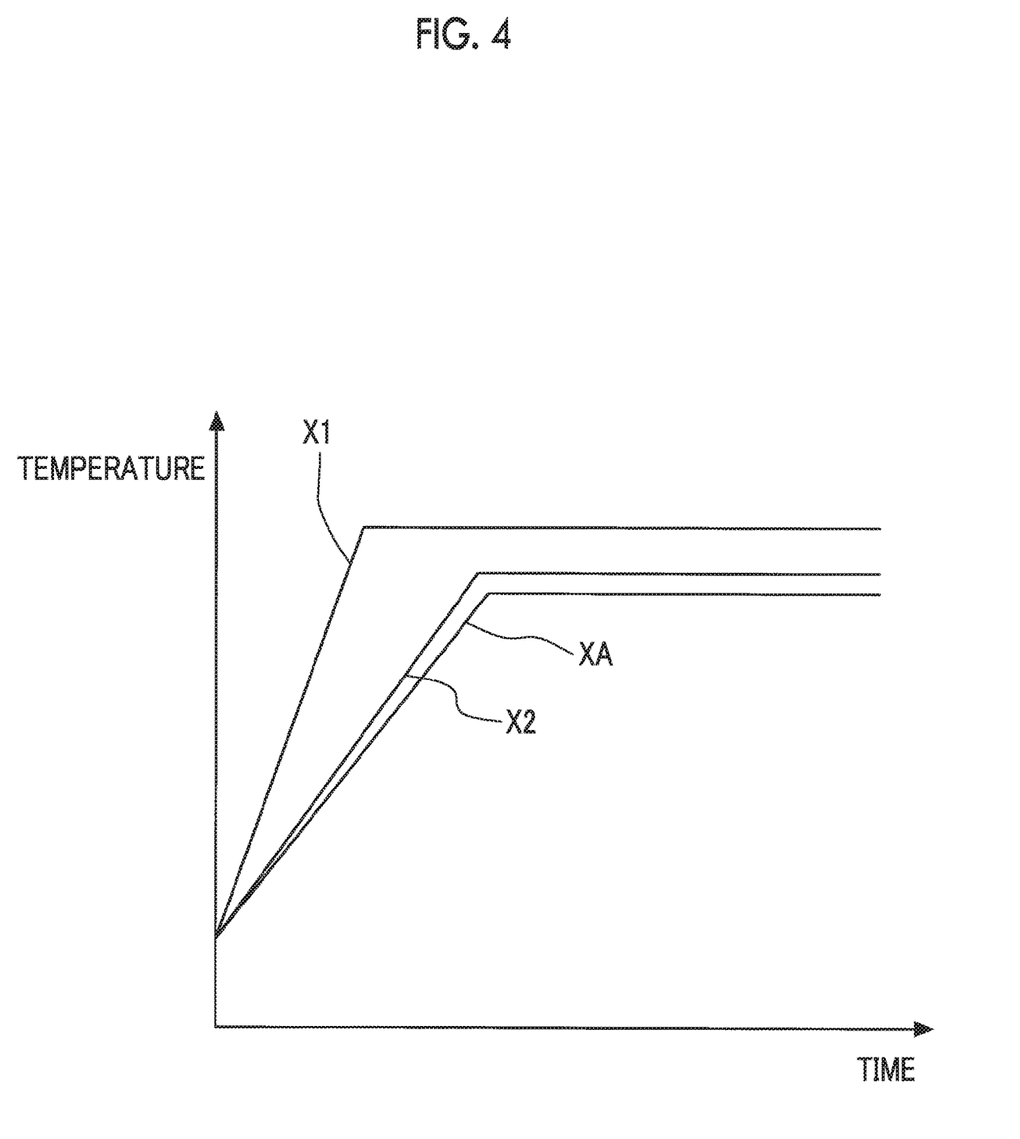
FIG. 4 is a graph showing a state of a temperature change when the temperature monitoring device according to the embodiment of the present invention and a composite material are heated.

More specifically, as shown in FIG. 4, an inclination of a straight line XA indicating a change in the temperature T2 is set to be smaller than inclinations of straight lines X1 and X2. Herein, the straight line X1 is a straight line indicating a temperature change of a "part where a temperature change is most likely to occur". In addition, the straight line X2 is a straight line indicating a temperature change of the "part where a temperature change is most unlikely to occur".

According to Expression (6), the straight line XA indicating a change in the temperature T2 is a linear function of R. Further, based on Expressions (1) and (4), R depends on a value of the heat resistance R3 of the air layer 60, and the value of the heat resistance R3 is governed by the thickness dimension La of the air layer 60. Therefore, the change rate of the temperature T2 of the temperature detection surface 11 (the inclination of the straight line XA) is determined by the value of La.

In a case where the composite materials W are, for example, wings of an aircraft, the "part where a temperature change is most unlikely to occur" described above corresponds to a region including a wing root, and the "part where a temperature change is most likely to occur" corresponds to a region including a wing tip.

Next, the adjustment step S4 is executed. In the adjustment step S4, the gap is adjusted to the dimension of the gap determined in the thickness determination step S3. In the adjustment step S4, the dimension of the gap between the outer component 20 and the inner component 10 in the thickness direction is adjusted to satisfy the thickness of the air layer 60 determined in the thickness determination step S3. Specifically, by moving the tab 23 formed on the outer component 20 along the slit 43, the dimension of the gap therebetween in the thickness direction is adjusted.

Next, the temperature monitoring step S5 is executed. In the temperature monitoring step S5, first, the temperature monitoring device 100 is disposed in the heating furnace 1 together with the composite materials W. In this state, the temperature of the atmosphere in the heating furnace 1 is raised to heat the composite materials W and the temperature monitoring device 100 (a heating step S6 in a composite material W manufacturing method to be described later). With the heating, the temperatures of the composite materials W and the temperature monitoring device 100 rise. Herein, the temperature change of the composite material W has a correlation with the temperature change of the temperature detection surface 11 in the temperature monitoring device 100. Therefore, by monitoring the temperature change of the temperature detection surface 11 with the thermocouple Tc, a temperature change inside the composite material W can be learned through simulation.

Further, the composite material W manufacturing method according to the embodiment includes each of the steps related to the temperature monitoring method described above and the heating step S6. In the heating step S6, the composite materials W in an uncured state are cured by heating the inside of the heating furnace 1. The heating step S6 is executed in parallel with the temperature monitoring step S5 in the temperature monitoring method. That is, the temperatures of the composite materials W are continuously or intermittently monitored over the entire period of heating the composite materials W. The composite materials W in a cured state are completed via the heating step S6.

In such a manner, the composite material W is manufactured as an FRP product.

Workings and Effects

As described hereinbefore, in the configuration according to the embodiment, by disposing and heating the temperature monitoring device 100 in the furnace together with the composite materials W, the temperature change of the composite material W can be reproduced under the same condition as the composite materials W. Further, the heat capacity (heat resistance) of the temperature monitoring device 100 can be freely and easily changed as the adjustment part 50 adjusts the thickness dimension of the gap (the air layer 60) between the inner component 10 and the outer component 20. That is, the temperature monitoring device 100 can be used for the plurality of composite materials W having different heat capacities (heat resistances) from each other in general.

Therefore, the temperature monitoring device 100 can easily acquire a temperature corresponding to the actual temperatures of the composite materials W in the furnace.

In order to guarantee a temperature inside a composite material component when manufacturing a large-scale a composite material component, such as an aircraft, in a heating furnace such as an autoclave and an oven, it is necessary to provide a temperature monitoring device including the thermocouple Tc that has a correlation with a component temperature other than the composite material component to measure the temperature.

The temperature monitoring device is configured by stacking a cured composite material, a cured metal, cured silicon, and cured glass cloth, similarly to the composite material component, such that the thermocouple has a correlation with the component temperature.

In this case, since the component temperature greatly varies depending on the heat capacity of the composite material component, it is necessary to select a configuration material for the temperature monitoring device according to the heat capacity of the composite material component and to adapt the configuration each time.

In addition, it is necessary to determine a configuration of the temperature monitoring device based on experimental rules. In a case where the temperature monitoring device cannot guarantee the component temperature, it is necessary to retest and costs are enormous.

Further, in a case of manually assembling the temperature monitoring device, a degree of close contact between the respective configuration materials differs depending on an operator, and thus it is difficult to obtain reproducibility.

On the other hand, in the embodiment, as the temperature monitoring device 100 has a variable heat resistance structure that can change the presence or absence and thickness of the air layer in accordance with the heat capacity of a composite material component, temperatures of a plurality of composite material components can be guaranteed with one temperature monitoring device.

For this reason, compared to a case where a configuration material for the temperature monitoring device is selected according to the heat capacity of the composite material component described above, the temperature monitoring device 100 can avoid trouble of selecting a material and adapting the configuration.

Further, since the temperature monitoring device 100 according to the embodiment can accurately control the thickness of the gap, which is a distance between configuration materials, reproducibility is obtained.

In the temperature monitoring device 100 according to the embodiment, a direction of heat input to the inner components 10, the outer components 20, and the air layers 60 can be restricted by the heat insulating supporting members 40. Herein, in the actual composite materials W, heat input from both sides in the thickness direction is dominant. In the configuration, as the heat insulating supporting members 40 are provided, heat input to the inner components 10, the outer components 20, and the air layers 60 occurs only from both sides in the thickness direction. As a result, the temperature monitoring device 100 can reproduce the temperature change of the composite material H with higher accuracy.

In the temperature monitoring device 100 according to the embodiment, the dimension of the gap in the thickness direction determined based on the heat capacity of the composite material W, and the dimension of the gap between the inner component 10 and the outer component 20 in the thickness direction is adjusted based on the determined dimension. That is, only by determining the thickness dimension of the air layer 60 and adjusting the dimension of the gap between the inner component 10 and the outer component 20 in the thickness direction to satisfy the determined thickness dimension of the air layer, the temperature monitoring device 100 can easily monitor temperatures of a plurality of types of composite materials W having different heat capacities from each other.

In the temperature monitoring method and the composite material W manufacturing method according to the embodiment, the heat capacity of the temperature monitoring device can be freely and easily changed by adjusting the dimension of the gap between the inner component and the outer component in the adjustment step S4.

Therefore, the temperature monitoring method and the composite material W manufacturing method allow easily acquiring a temperature corresponding to the actual temperature of the composite material in the furnace.

Further, by having the adjustment step S4, heat capacity adjustment operation in the preparation step S1 and the assembly step S2 can be greatly reduced.

In addition, in the composite material manufacturing method according to the embodiment, the temperature of the composite material W can be appropriately managed when executing the heating step S6. As a result, the composite material W manufacturing method allows easily manufacturing the composite material W having a higher quality.

Modification Example

Figure 5:
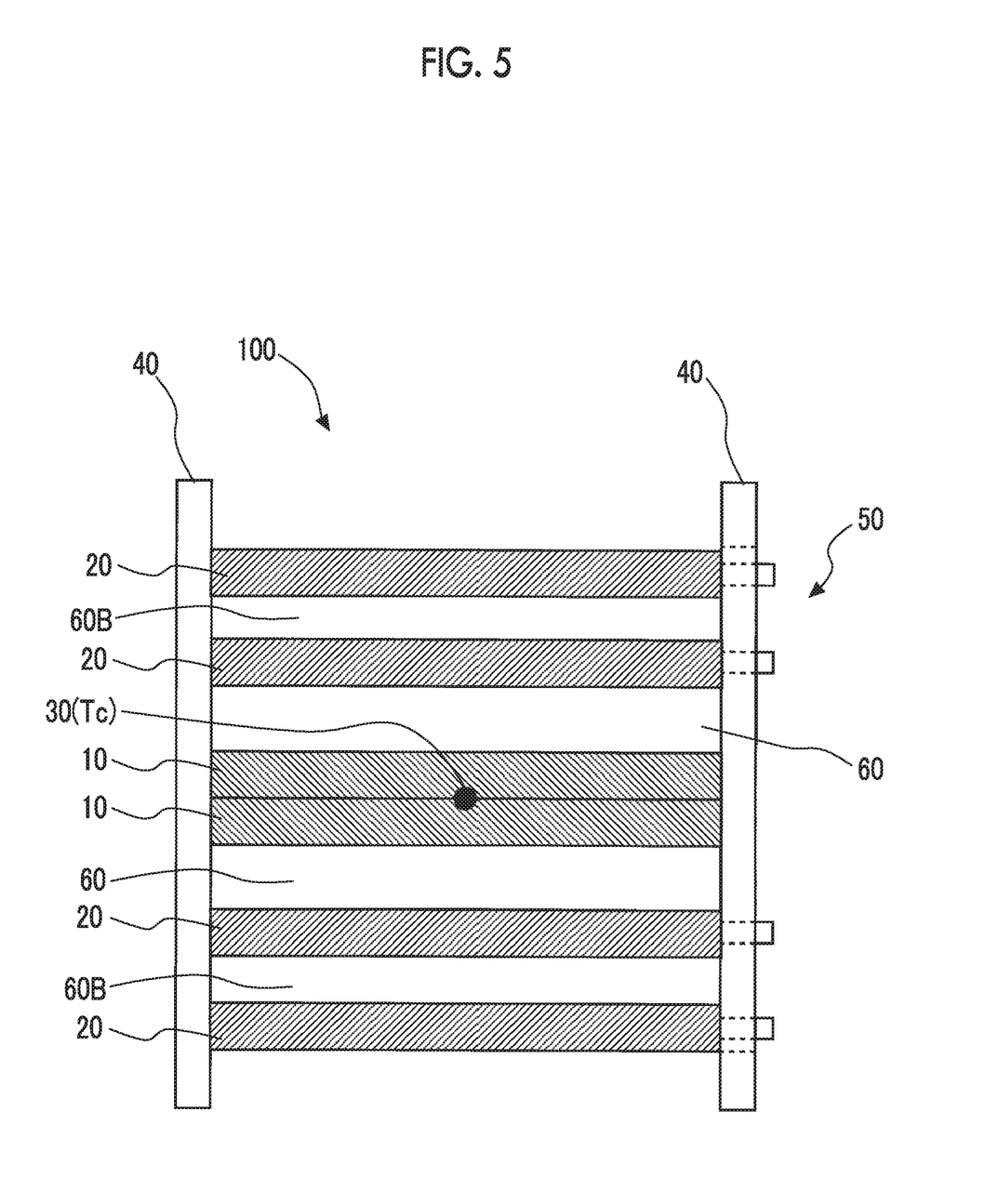
FIG. 5 is a sectional view illustrating a modification example of the temperature monitoring device according to the embodiment of the present invention.

In the embodiment, only one pair of outer components 20 are provided on both sides of the inner components 10. As illustrated in FIG. 5, it is also possible to adopt a configuration where a plurality of pairs of outer components 20 are included as a modification example. In this case, another air layer 60B may be formed between the outer components 20 and 20 adjacent to each other.

In the configuration, by providing the plurality of pairs of outer components 20, a range of a heat capacity that can be reproduced by the temperature monitoring device 100 can be further expanded. That is, the generality of the temperature monitoring device 100 can be further improved.

Also in this case, an adjustment part may be further provided such that the dimension of each gap between the outer components 20 adjacent to each other in the thickness direction is adjustable. Accordingly, a heat capacity (heat resistance) between adjacent outer components 20 can be freely and easily changed.

In the embodiment, both of the inner components 10 and the outer components 20 are sheet-like members formed of the same material as the prepregs configuring the composite materials W.

As a modification example, the inner components 10 and the outer components 20 may be formed of a material that is not the same as the prepreg.

As another modification, out of the inner components and the outer components 20, one may be formed of a material that is not the same as the prepreg, and the other may be formed of the same material as the prepreg.

Although the temperature monitoring device 100 includes the pair of inner components 10 and at least the pair of outer components 20 in the embodiment, materials configuring the respective inner components 10 may be different from each other or may be the same. Similarly, also materials configuring the respective outer components 20 may be different from each other or may be the same.

An example in which the thickness determination step S3 is executed after the assembly step S2 in the temperature monitoring method has been described in the embodiment. However, a timing of executing the thickness determination step S3 is not limited to the description above, it is also possible to execute the thickness determination step before the assembly step S2 or before the preparation step S1 as another example.

Although the preparation step S1 is executed in the temperature monitoring method in the embodiment, the preparation step S1 may be omitted when the temperature monitoring device 100 is prepared in advance.

Similarly, although the assembly step S2 is executed in the temperature monitoring method in the embodiment, the assembly step S2 may be omitted when the temperature monitoring device 100 is assembled in advance.

Although some embodiments of the present invention have been described hereinbefore, the embodiments are presented as examples and are not intended to limit the scope of the invention. The embodiments can be implemented in other a variety of forms, and various omissions, replacements, and changes can be made without departing from the spirit of the invention. The embodiments and the modifications thereof are included in the scope of the invention described in the claims and the scope of equivalents thereof as included in the scope and spirit of the invention.

The embodiments of the present invention have been described hereinbefore. It is possible to execute various changes and improvements in the configurations and the method without departing from the spirit of the present invention.

INDUSTRIAL APPLICABILITY

According to an aspect described above, a temperature corresponding to the actual temperature of the composite material in the furnace can be easily acquired.

REFERENCE SIGNS LIST

1: heating furnace
10: inner component
11: temperature detection surface
12: first heat input surface
20: outer component
21: heat transfer surface
22: second heat input surface
23: tab
30: temperature detecting unit 40: heat insulating supporting member
41: support surface
42: outer surface
43: slit
50: adjustment part
60: air layer
60B: air layer
100: temperature monitoring device
S1: preparation step
S2: assembly step
S3: thickness determination step
S4: adjustment step
S5: temperature monitoring step
S6: heating step
Tc: thermocouple
W: composite material

The invention claimed is:

1. A temperature monitoring device that is able to be disposed in a furnace together with a composite material, the device comprising:
   a pair of inner components that each have a temperature detection surface and overlap each other such that the temperature detection surfaces face each other;
   a temperature detecting unit that is disposed so as to be sandwiched between the temperature detection surfaces;
   at least a pair of outer components that are provided on opposite sides to the temperature detection surfaces of the pair of inner components respectively; and
   an adjustment part that adjusts a dimension of a gap between the inner component and each of the outer components in a thickness direction,
   wherein an air layer is formed between at least one of the inner components and at least one of the outer components.

2. The temperature monitoring device according to claim 1,
   wherein a plurality of pairs of the outer components are provided.

3. The temperature monitoring device according to claim 1, further comprising:
   a heat insulating supporting member that covers the inner component, the outer component, and the gap from both sides in a direction intersecting the thickness direction and has a higher heat insulating property than the inner component and the outer component.

4. A composite material manufacturing method, the composite material being used in a temperature monitoring method using a temperature monitoring device that is disposed in a furnace together with a composite material, in which the temperature monitoring device includes
   a pair of inner components that each have a temperature detection surface and overlap each other such that the temperature detection surfaces face each other,
   a temperature detecting unit that is disposed so as to be sandwiched between the temperature detection surfaces, and
   at least a pair of outer components that are provided on opposite sides to the temperature detection surfaces of the pair of inner components respectively,
   the composite material manufacturing method comprising:
   a thickness determination step of determining a dimension of a gap between the inner component and each of the outer components in a thickness direction based on a heat capacity of the composite material;
   an adjustment step of adjusting the dimension determined in the thickness determination step, and
   an air layer forming step of forming an air layer between at least one of the inner components and at least one of the outer components.

5. A composite material manufacturing method according to claim 4, further comprising:
   a heating step of heating the composite material in the furnace.

* * * * *